United States Patent [19]

Rhodes

[11] Patent Number: 4,607,911

[45] Date of Patent: Aug. 26, 1986

[54] CONNECTOR FOR AN OPTICAL FIBER HAVING A STATIONARY CLAMP ENGAGED AND OPERATED BY A ROTATABLE MEMBER

[75] Inventor: Geoffrey M. Rhodes, Orchard Park, N.Y.

[73] Assignee: Conax Buffalo Corporation, Buffalo, N.Y.

[21] Appl. No.: 538,191

[22] Filed: Oct. 3, 1983

[51] Int. Cl.⁴ .................................................. G02B 6/36
[52] U.S. Cl. ............................... 350/96.20; 350/96.21
[58] Field of Search ................ 350/96.20, 96.21, 96.22

[56] References Cited

U.S. PATENT DOCUMENTS

| 3,946,467 | 3/1976 | Lukas et al. | 24/260 |
| 4,435,036 | 3/1984 | Sarakawa | 350/96.20 |
| 4,458,983 | 7/1984 | Roberts | 350/96.20 |

OTHER PUBLICATIONS

*IBM Technical Disclosure Bulletin*, "Fiber-Optic Male Connector," vol. 22, No. 10, Mar. 1980, p. 4475, L. A. Price II and J. R. Statkevicus.

*Primary Examiner*—William L. Sikes
*Assistant Examiner*—Lester Rushin, III
*Attorney, Agent, or Firm*—Sommer & Sommer

[57] ABSTRACT

A way of terminating an optical fiber is provided by collet-chuck type means which do not involve stripping, crimping or cementing.

5 Claims, 8 Drawing Figures

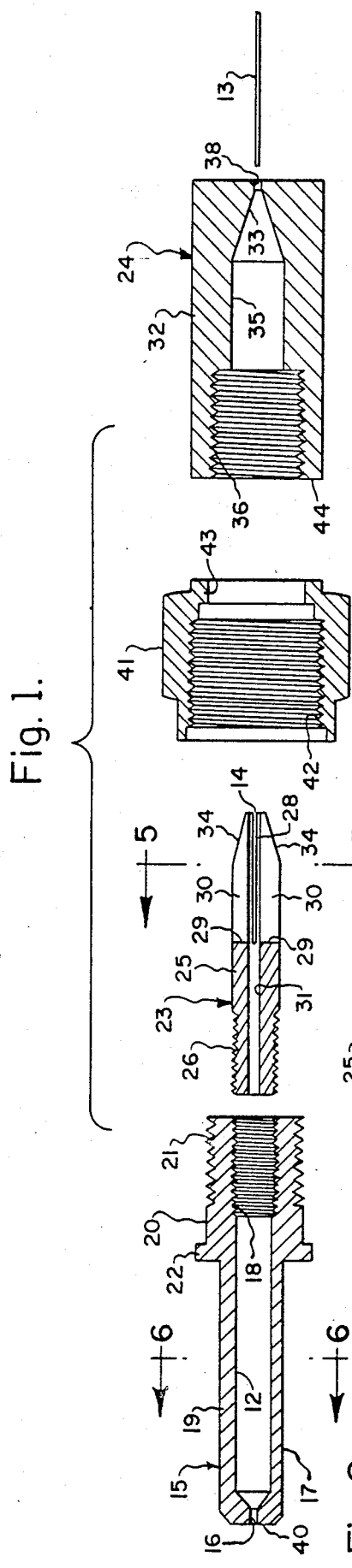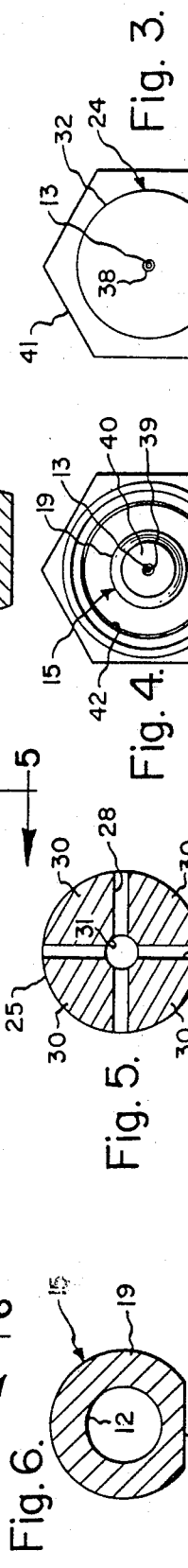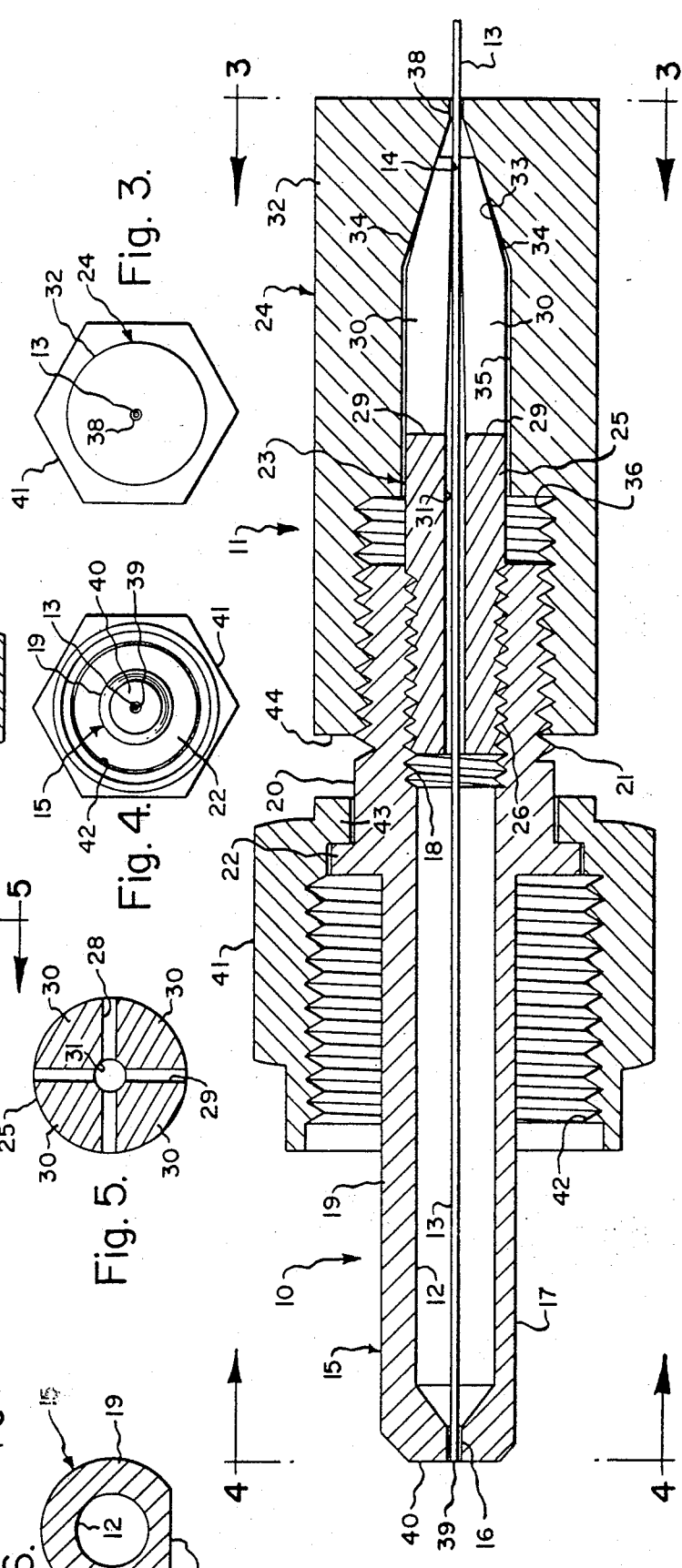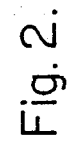
Fig. 1. Fig. 3. Fig. 4. Fig. 5. Fig. 6. Fig. 2.

CONNECTOR FOR AN OPTICAL FIBER HAVING A STATIONARY CLAMP ENGAGED AND OPERATED BY A ROTATABLE MEMBER

This invention relates to the art of fiber optics, and more particularly to an optical fiber connector.

Optical fibers are used for visual or data monitoring. They are made up of a central circular core surrounded by an annular cladding. Optical transmission in a fiber occurs in the core and the light rays propagate by total internal reflection of the core cladding interface, which is of lower index of refraction.

Cables of one or more optical fibers are jacketed with one or more jackets, sometimes with an annular layer of strength members such as fiberglass being included.

Terminating an optical fiber presents a problem. In the case of cable, one of the known ways of terminating the optical fiber is to apply a connector involving jacket stripping, crimping and utilizing epoxy cement. Such a termination mode is not readily suitable for an unjacketed optical fiber. Moreover, epoxy is unsuitable for use in a high temperature environment, for example, where the temperature is over 300° F. and may go up to 1000° F.

Accordingly, the primary object of the present invention is to provide an optical fiber connector for terminating an optical fiber unprovided with a jacket.

Another object is to provide such an optical fiber connector which is usable in an environment having a temperature ranging from 300° F. to 1000° F.

Another object is to provide such an optical fiber connector which will not damage the optical fiber or introduce microbending.

Another object is to provide such an optical fiber connector which can accommodate optical fibers having different outside diameters within a reasonable range of variation.

Still another object is to provide such an optical fiber connector which can be adjusted to clamp optical fibers falling within a range of different outside diameters with a generally similar amount of clamping force.

Yet another object is to provide such an optical fiber connector which is angularly oriented in a predetermined angular position about the longitudinal axis of the optical fiber when mounting the connector on a support.

A further object is to provide such an optical fiber connector which is simple in construction, relatively inexpensive to manufacture, and easy to use.

SUMMARY OF THE INVENTION

The present invention provides an optical fiber connector which comprises a body having a passage through which an optical fiber can extend, and collet-chuck type means mounted on said body arranged to define a constrictive opening in said passage, whereby an optical fiber which extends through said opening is connectable to said body.

The foregoing objects and other advantages will become apparent from the following detailed description of a preferred embodiment of the invention shown in the accompanying drawings in which:

FIG. 1 is an exploded view of the various components of the inventive optical fiber connector, severally shown in longitudinal section.

FIG. 2 is an enlarged central longitudinal sectional view of the assembled inventive optical fiber connector, and showing the same connected to an optical fiber which extends therethrough.

FIG. 3 is a right end view of the connector shown in FIG. 2.

FIG. 4 is a left end view of the connector shown in FIG. 2.

FIG. 5 is an enlarged transverse sectional view of the clamp member shown in FIG. 1, taken on line 5—5 thereof.

FIG. 6 is an enlarged transverse sectional view of the body member shown in FIG. 1, taken on line 6—6 thereof.

DESCRIPTION OF THE PREFERRED EMBODIMENT

Figure 7:
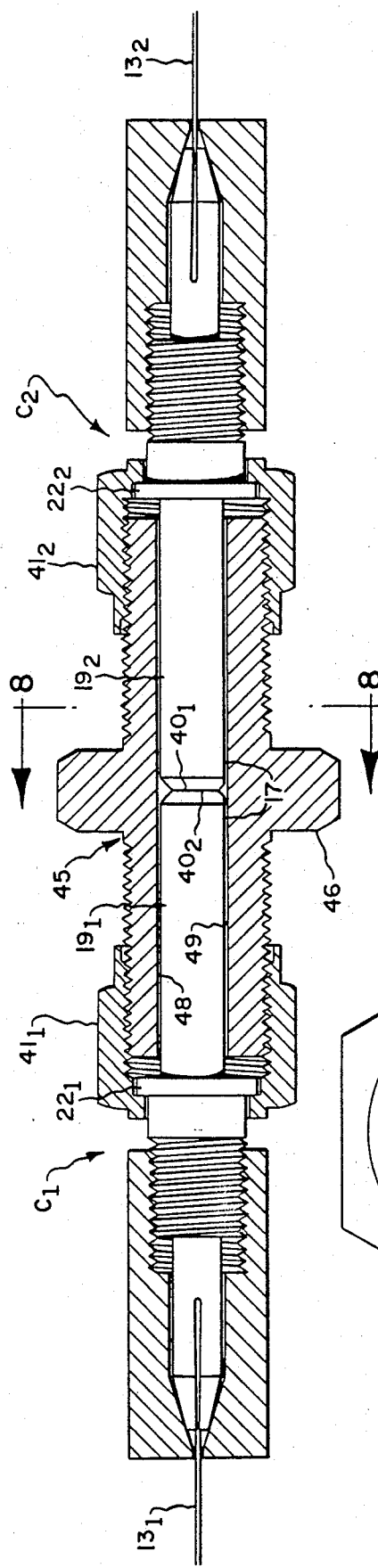
FIG. 7 shows an assembly of two inventive optical fiber connectors joined together to illustrate how two terminated optical fibers can be arranged in abutting end-to-end fashion for optical signal transmission from one optical fiber to the other.

The preferred embodiment of the inventive optical fiber connector, illustrated in assembled condition in FIG. 2, is shown as comprising body means represented generally by the numeral 10, and collet-chuck type means represented generally by the numeral 11.

Body means 10 are provided with a passage 12 through which an optical fiber 13 can extend. This fiber may have an outside diameter falling in the range of from 125 to 1000 microns.

Collet-chuck type means 11 define a constrictive opening 14 in passage 12, whereby optical fiber 13 is connectable to body means 10.

More specifically, body means 10 includes an elongated tubular body member 15 having a reduced opening 16 at its outer or left end, and is internally threaded at 18 at its opposite end for about one quarter of its length. Opening 16 is only slightly larger in diameter than that of optical fiber 13. Body member 15 is shown as havng an externally cylindrical left end portion 19 for about two thirds its length. A chordal flat 17 is shown as provided on the bottom of body portion 19 and extends the full length thereof, for a purpose described later herein. The right end portion 20, approximately one third the length of member 15, is of enlarged cylindrical form, being externally threaded at its extreme right end portion as indicated at 21, and also is shown as having a radially enlarged annular collar 22 to the left of threaded portion 21.

Collet-chuck type means 11 are shown as including clamp means 23 defining restrictive opening 14, and means 24 for operating clamp means 23. Clamp means 23 are shown as comprising an elongated tubular member 25, externally threaded at its left end portion as indicated at 26, and provided at its right end portion with a horizontal transverse slit 28 and a vertical transverse slit 29. These slits 28 and 29 provide an annular array of four clamp fingers 30 surrounding the central hole 31 passing longitudinally through member 25. Restrictive opening 14 is defined by the free or right end portions of fingers 30. Clamp member 25 is adapted to be screwed into body member 15 by mating the threaded portions 18 and 26. In this manner, clamp fingers 30 collectively have a threaded engagement with or mounting on body member 15. When so mounted on body member 15, clamp member may be regarded as part of the body means 10, and through hole 31 in this clamp member forms part of body passage 12.

The clamp operating means 24 are shown as comprising an elongated tubular nut member 32 having an internal conical cam surface 33 engageable and cooperable with a longitudinally tapered and transversely curved external cam surface 34 on the free end of each clamp finger 30. Cam surfaces 34 collectively provide an interrupted conical cam surface having a slightly flatter angle than that for internal cam surface 33. This surface 33 forms part of the wall surface of a central longitudinal through hole 35 provided in member 32. The left end portion of the wall for hole 35 is internally threaded as indicated at 36 to screw onto the threads 21 on body member 15. The right end portion 38 of hole 35 is reduced in transverse diameter so as to be slightly larger than optical fibre 13. Opening 38 preferably has the same diameter as body end opening 16.

Referring to the assembled components shown in FIG. 2, optical fiber 13 is shown as extending through body passage 12 formed collectively by the alined hole portions 16,31 and 38, including constrictive opening 14. The left end face 39 of optical fiber 13 is shown as being flush with left end face 40 of body member 15.

It will be seen that when nut member 32 is rotated relative to body member 15 on its threaded connection 21,36 therewith, member 32 can be moved relative to member 15 in an axial direction such as leftwardly so as to force cam surface 33 against cam surfaces 34 on fingers 30, thereby causing the cluster of fingers to contract and reduce the transverse dimension of constrictive opening 14. This moves the radially inwardly facing curved surfaces on the free end portions of fingers 30 to press against and clamp onto the opposing peripheral portion of optical fiber 13. Thereby, this fiber is held to the connector body and prevented from shifting longitudinally so as to destroy the coplanar arrangement of end faces 39 and 40. The clamping force is applied so as not to crush or otherwise damage the optical fiber.

To mount the connector on the optical fiber, the nut member 32 is unscrewed so as to separate cam surfaces 33,34, or at least reduce the force across the interface therebetween, thus allowing clamp fingers 30 to spread and enlarge opening 14 to a transverse dimension larger than the outside diameter of the optical fiber. Thereafter, an optical fiber such as 13 is inserted through opening 38, and threaded through openings 14 and 16, following which nut member 32 is tightened to squeeze clamp fingers 30 against the optical fiber and hold the same firmly to body member 15. Any exposed end portion of fiber 13 may then be cut off to provide end face 39 flush with body end face 40.

If desired, the clamp member 25 may be formed of a plastic material such as polysulfone, a thermoplastic material which possesses some resilience and also provides good frictional contact with the plastic or glass cladding on a typical optical fiber. However, it has been found satisfactory to make the clamp member 25 of brass, also used as the material of construction for members 15 and 32.

The formation of threads 18 and 26 and the extent of their axially overlapping engagement is such as to provide sufficient friction to hold clamp member 25 against rotation relative to body member 15 while nut member 32 is being tightened. Such friction in the threaded connection 18,26 overcomes the friction generated between relatively sliding cam surfaces 33,34 while nut member 32 is being turned. This prevents twisting of the optical fiber which might occur otherwise if clamp member 25 were allowed to turn relative to body member 15.

It is also a feature of the present invention to provide a connector which can be adjusted to clamp opitcal fibers falling within a range of different outside diameters with a generally similar amount of clamping force. This renders the inventive connector suitable for different nominal sizes of optical fibers. Also, sometimes a given optical fiber has an outside diameter varying along its length.

In order to produce the desired clamping force, it will be seen that constrictive opening 14 must be enlarged as the outside diameter of a particular optical fiber 13 increases. On the other hand, as the outside diameter of an optical fiber decreases, constrictive opening 14 must be contracted. Contraction is accomplished by screwing nut member 32 farther onto clamp member 25. In order to provide more clearance for the inner end of nut member 32, clamp member 25 can be unscrewed relative to body member 15 so as to project therefrom farther outwardly or rightwardly. Thus, clamp member 25 provides an adjustable extension of body member 15. By axially positioning members 15,25, and 32 relative to one another, the desired clamping force can be produced for all sizes of optical fibers within a reasonable range of different outside diameters.

As an illustration of how the inventive optical fiber connector can be used in a data link, FIG. 7 shows two identical connectors $C_1$ and $C_2$ joined together so that their respective body end faces $40_1$ and $40_2$ are in firm abutting relation without angular misalignment. The respective optical fibers $13_1$ and $13_2$ carried by connectors $C_1$ and $C_2$ have their end faces flush with body end faces $40_1$ and $40_2$.

For the purpose of joining the two connectors, and referring back to FIGS. 1 and 2, the inventive connector is shown as having a coupling nut 41 mounted thereon. Nut 41 is internally threaded at 42 for most of its length, but has an inturned annular flange 43 at its right end which surrounds body portion 20 and radially overlaps body collar 22 on the right side thereof. Nut 41 is confined on body portion 20 by the opposing left end face 44 of member 32. Thus, nut 41 is freely rotatable on body member 15 but limited in its axial movement thereon.

Now returning to FIG. 7, an externally threaded bulk head sleeve member 45 having an enlarged central head portion 46 is provided for receiving the threads of coupling nuts $41_1$ and $41_2$. Member 45 as a cylindrical through hole 48 coaxial with its external threads. Hole 48 has a chordal flat 49 extending its full length. The diameter of hole 48 is slightly larger than cylindrical portion 19 of body member 15. Also, flat 49 is radially out slightly farther than flat 17 on body portion 19.

Figure 8:
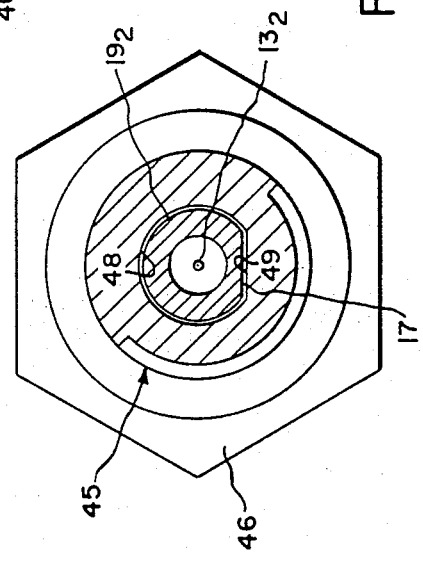
FIG. 8 is an enlarged transverse sectional view of the assembly shown in FIG. 7, taken on line 8—8 thereof.

To provide the assembly shown in FIG. 7, the body portions $19_1$ and $19_2$ of connectors $C_1$ and $C_2$ are angularly oriented relative to sleeve member 45 so that they can be inserted into hole 48 with the flats 17 and 49 opposing one another, as shown in FIG. 8. Thereafter, by turning each coupling nut $41_1$, $41_2$ on sleeve 45 in the appropriate direction, these nuts can be pulled toward each other and by bearing against their respective body collars $22_1$ and $22_2$, force the end faces $40_1$ and $40_2$ into firm abutting relation so that optical signals can be transmitted across the interface between abutting optical fibres $13_1$ and $13_2$.

Providing the opposing flats 17 and 49 allows the connectors $C_1$ and $C_2$ to be keyed to one another by being keyed commonly to sleeve member 45. This assures maintenance of the angular orientation of optical fibers $13_1$ and $13_2$ to one another, which may be critical, during disassembly and reassembly of the joining structure illustrated in FIGS. 7 and 8. Thus, each of the inventive connectors $C_1$ and $C_2$ includes a body having an out-of-round part $19_1$ or $19_2$, preferably provided by a cylindrical surface but for at least one chordal flat 17 as shown, whereby each such connector can be angularly oriented in a predetermined angular position about the longitudinal axis of the optical fiber which it holds when mounting the connector on a support, such as illustrated by sleeve member 45.

Of course, the inventive optical fiber connector for terminating an opitcal fiber can be connected to any other suitable light source or drive circuitry device. Also, if desired, a group of any number of the inventive optical fiber connectors can be manifolded by being mounted on a common support and thereby terminate a corresponding number of optical fibers as a unit.

Other variations and modifications in the illustrated optical fiber connector may occur to those skilled in the art without departing from the spirit of the invention, the scope of which is to be measured by the appended claims.

What is claimed is:

1. An optical fiber connector, comprising:
    an elongated tubular body member having a passage extending longitudinally therethrough from end to end and in which an optical fiber can be arranged so as to be flush with the end face at one end of said body member,
    a metallic clamp member fast to said body member at the other end thereof so as to be stationary with respect to said body member and defining a constrictive opening, and
    a rigid clamp operating member rotatably engaging said clamp member and movable relative to said body member in a direction axially of said passage for causing said clamp member to constrict said opening, whereby an optical fiber which extends through said opening is mountable on said body member.

2. An optical fiber connector according to claim 1 wherein:
    said clamp member includes an annular array of clamp fingers arranged to surround an optical fiber and be collapsed radially thereagainst to grip the same without rotating the optical fiber nor producing longitudinal movement thereof.

3. An optical fiber connector according to claim 1 wherein:
    said clamp member has a threaded connection to said body member at its said other end, and
    said clamp operating member also has a threaded connection to said body member at its said other end, whereby the longitudinal position of said clamp member relative to said body member is adjustable to accommodate movement of said clamp operating member relative to said body member for different diameters of optical fibers.

4. An optical fiber connector according to claim 1 which further comprises:
    a coupling nut member rotatably mounted on said body member and arranged to have an abutting engagement therewith, and
    said clamp operating member has a threaded connection to said body member and serves to retain said coupling nut member on said body member.

5. An optical fiber connector according to claim 1 wherein:
    said body member has an out-of-round part for angularly orienting the connector in a predetermined angular position when mounting the same on a support having a complementary out-of-round cavity adapted to receive said part.

* * * * *